(12) United States Patent
Gauthier et al.

(10) Patent No.: US 9,174,702 B1
(45) Date of Patent: Nov. 3, 2015

(54) SNOWMOBILE EXHAUST SYSTEM

(71) Applicant: BOMBARDIER RECREATIONAL PRODUCTS INC., Valcourt (CA)

(72) Inventors: Mathieu Gauthier, Sherbrooke (CA); Michel Lefebvre, Valcourt (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 113 days.

(21) Appl. No.: 13/927,280

(22) Filed: Jun. 26, 2013

Related U.S. Application Data

(60) Provisional application No. 61/665,944, filed on Jun. 29, 2012.

(51) Int. Cl.
*B62D 21/00* (2006.01)
*B62M 27/02* (2006.01)

(52) U.S. Cl.
CPC ...................... *B62M 27/02* (2013.01)

(58) Field of Classification Search
CPC .............................. B60K 13/04; B62M 27/02
USPC ........... 180/190, 186, 182, 68.3, 309; 440/89; 123/65 PE, 323, 312, 314, 324
See application file for complete search history.

(56) References Cited

U.S. PATENT DOCUMENTS

| | | | |
|---|---|---|---|
| 5,992,552 A * | 11/1999 | Eto ............................... | 180/190 |
| 6,263,991 B1 | 7/2001 | Savage et al. | |
| 6,595,309 B1 | 7/2003 | Savage et al. | |
| 6,796,395 B1 | 9/2004 | Berg et al. | |
| 6,802,383 B2 | 10/2004 | Nishijima | |
| 6,808,034 B2 | 10/2004 | Nakano et al. | |
| 6,880,660 B1 | 4/2005 | Berg et al. | |
| 6,904,990 B2 | 6/2005 | Etou | |
| 7,059,440 B1 | 6/2006 | Berg et al. | |
| 7,063,178 B2 | 6/2006 | Etou | |
| 7,100,730 B2 | 9/2006 | Eide | |
| 7,147,074 B1 | 12/2006 | Berg et al. | |
| 7,367,418 B2 | 5/2008 | Eide | |
| 7,401,674 B1 | 7/2008 | Berg et al. | |
| 7,448,462 B2 | 11/2008 | Etou | |

(Continued)

FOREIGN PATENT DOCUMENTS

| | | |
|---|---|---|
| CA | 2300342 A1 | 7/2000 |
| CA | 2411519 A1 | 7/2000 |

OTHER PUBLICATIONS

Revolt 800, Redline Performance Products, Inc., 2003.

(Continued)

*Primary Examiner* — Joseph Rocca
*Assistant Examiner* — Jacob Knutson
(74) *Attorney, Agent, or Firm* — BCF LLP

(57) ABSTRACT

A snowmobile has a frame including a tunnel, a least one ski operatively connected to the frame, a seat disposed above the tunnel, a fuel tank disposed on the frame, and an engine connected to the frame forwardly of the fuel tank. The engine has at least one cylinder, at least one intake port, at least one exhaust port, and a laterally extending output shaft defining an output shaft axis. An endless track is disposed at least in part under the tunnel and is operatively connected to the engine. An air intake system is fluidly connected to the at least one intake port. An exhaust system is fluidly connected to the at least one exhaust port. The exhaust system includes a muffler disposed between the output shaft axis and the fuel tank in a longitudinal direction of the snowmobile.

32 Claims, 13 Drawing Sheets

(56) References Cited

U.S. PATENT DOCUMENTS

| | | |
|---|---|---|
| 7,815,002 B2 | 10/2010 | Etou |
| 8,037,961 B2 | 10/2011 | Fecteau |
| 2001/0015297 A1 | 8/2001 | Harle et al. |
| 2002/0129982 A1 | 9/2002 | Harle et al. |
| 2004/0031636 A1* | 2/2004 | Pichler et al. ................. 180/190 |
| 2004/0159484 A1 | 8/2004 | Harle et al. |
| 2004/0182623 A1* | 9/2004 | Morii et al. ................... 180/190 |
| 2004/0188159 A1* | 9/2004 | Yatagai et al. ................ 180/182 |
| 2009/0152036 A1* | 6/2009 | Okada et al. .................. 180/190 |

OTHER PUBLICATIONS

2002 Fast Blade; Snow Tech, Sep. 2001, pp. 107-110.
Fast Blade: On the Cutting Edge, Premier, 2001, pp. 44-46.
Blade Snowmobiles Brochure, Fast Inc., 2001.

* cited by examiner

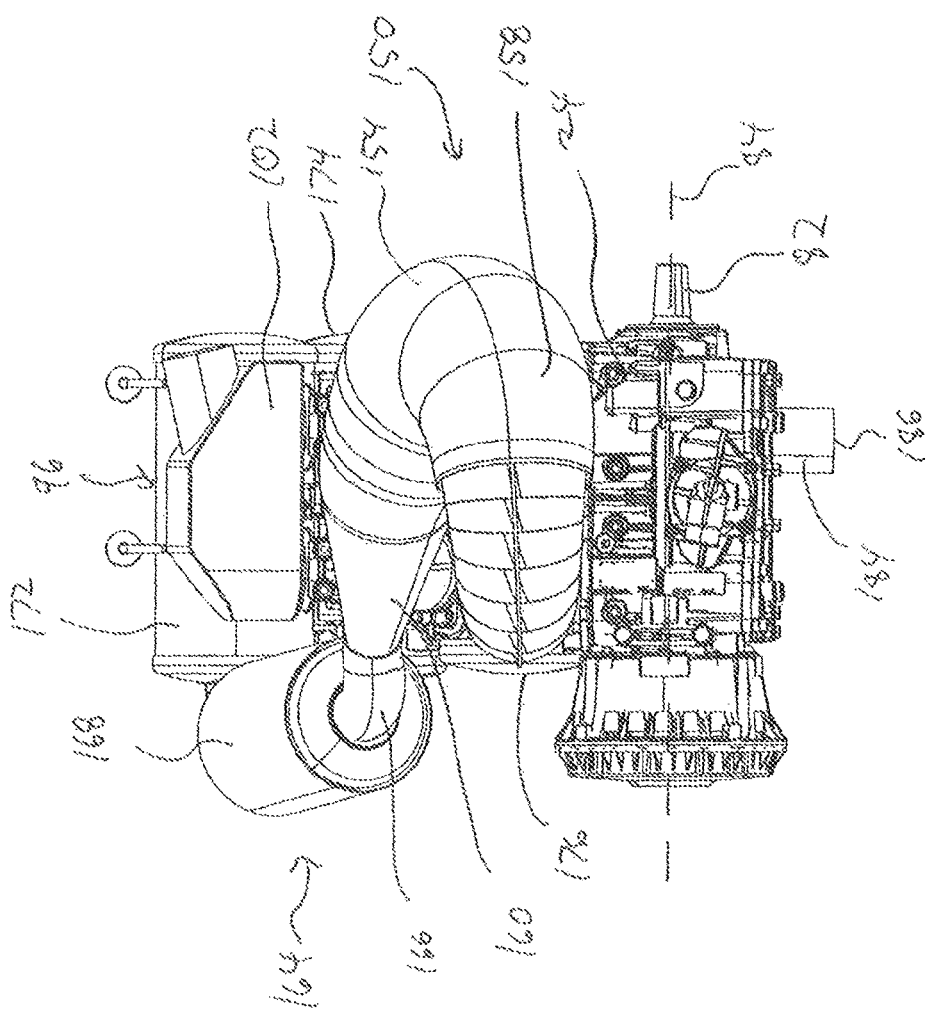

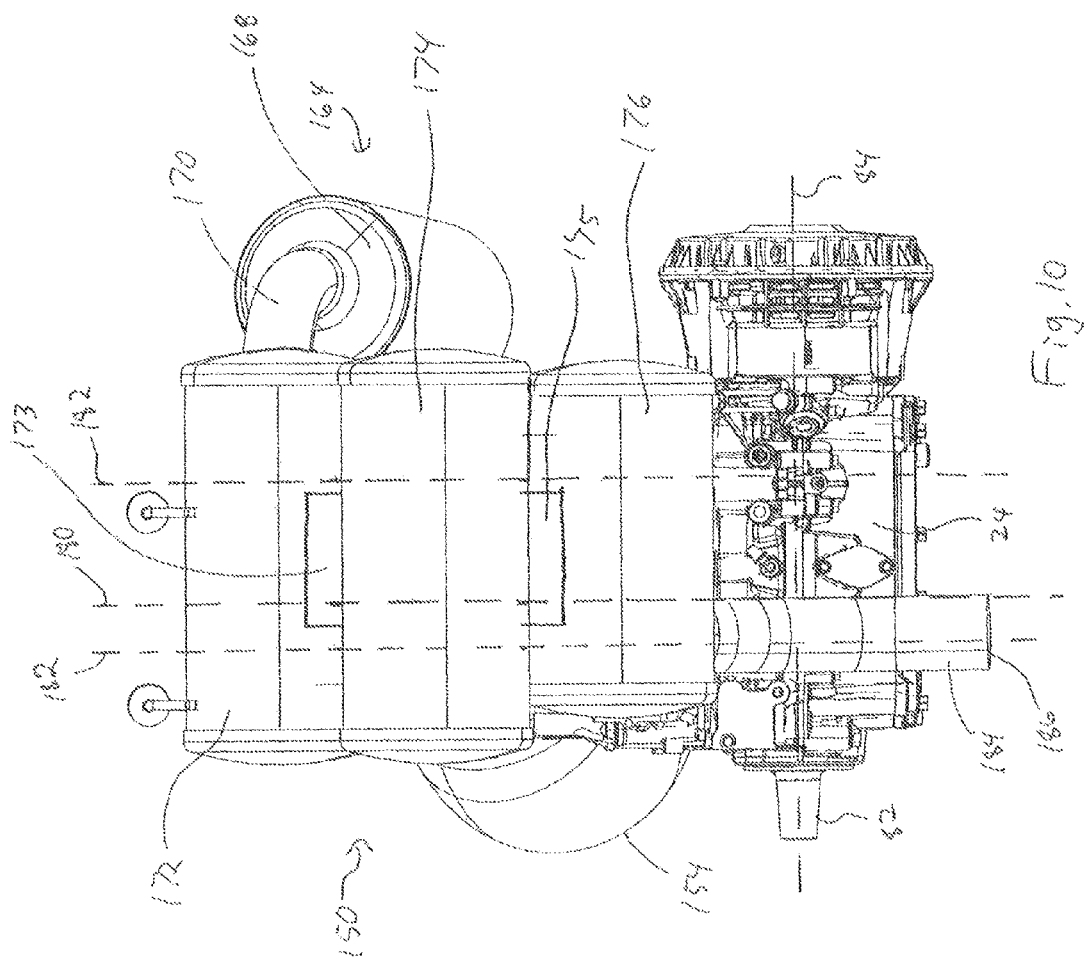

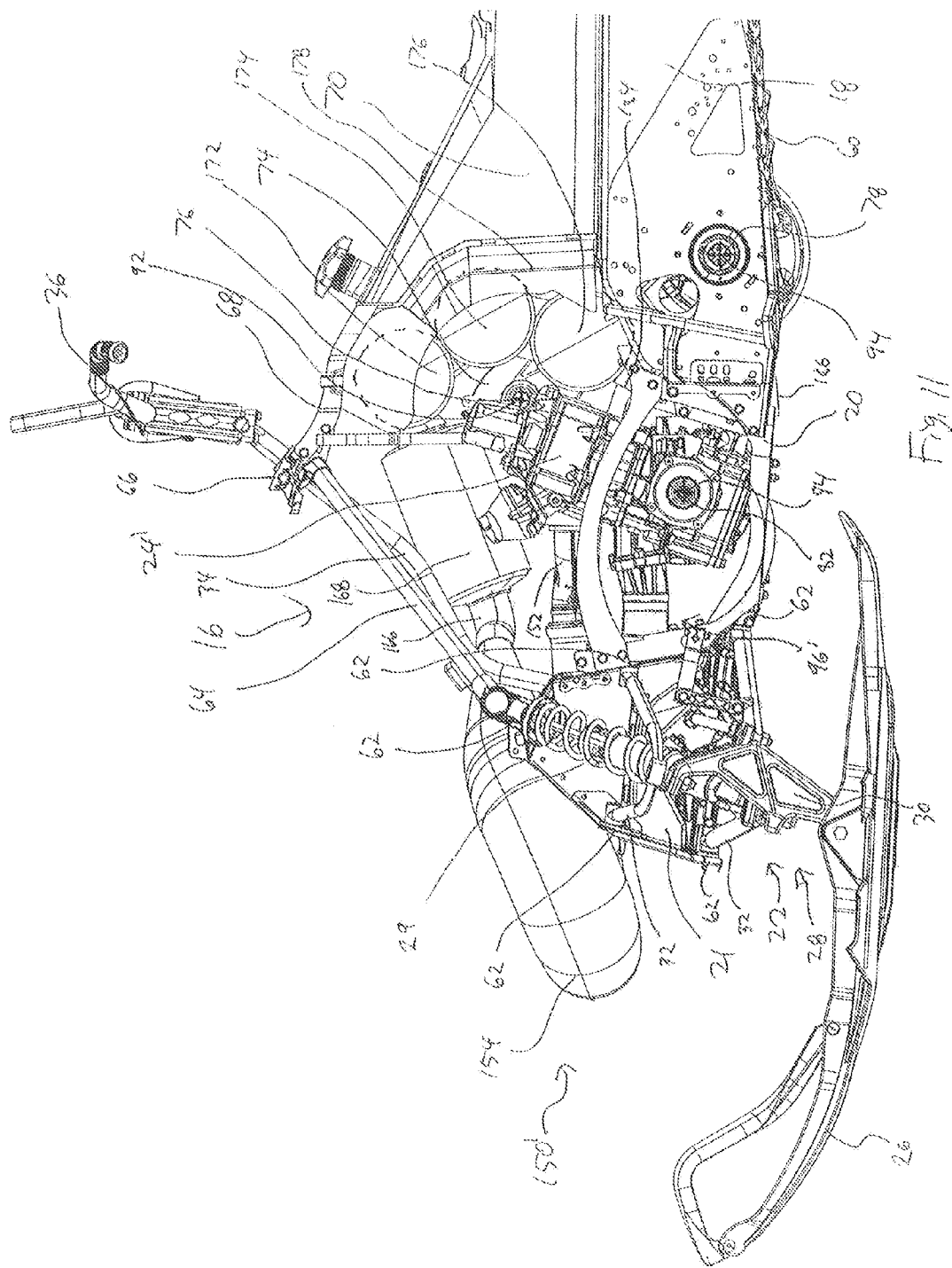

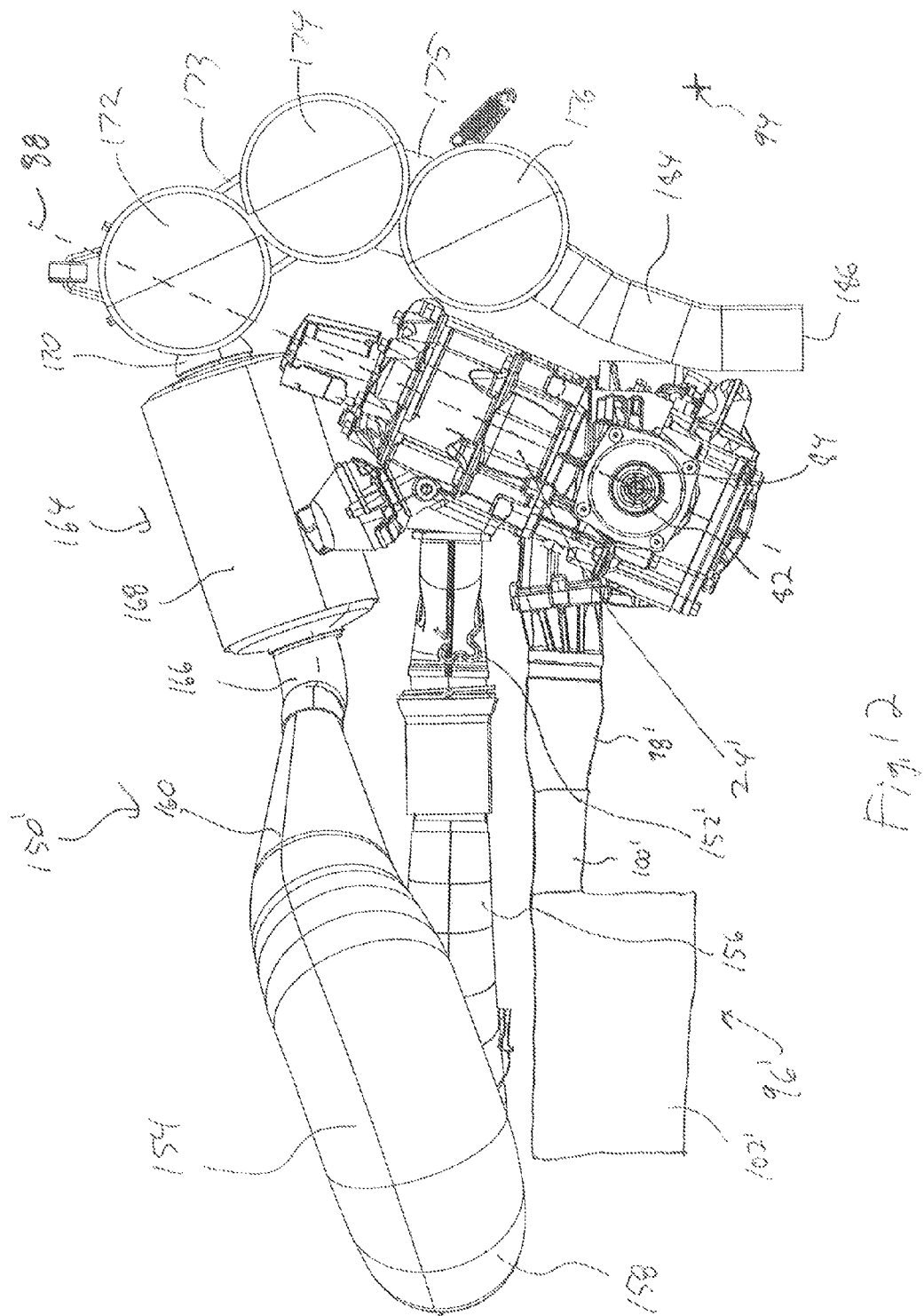

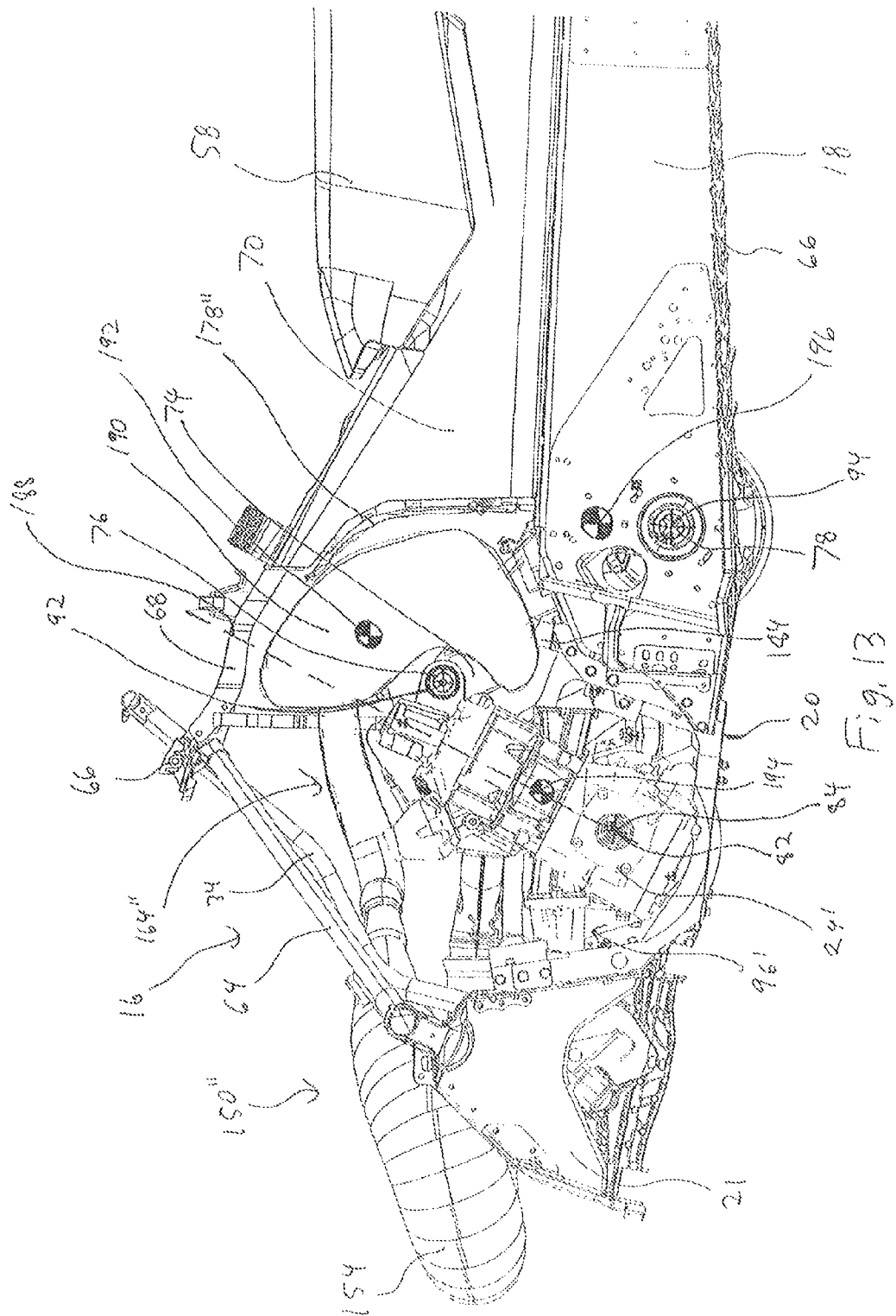

SNOWMOBILE EXHAUST SYSTEM

CROSS-REFERENCE

The present application claims priority to U.S. Provisional Patent Application No. 61/665,944, filed on Jun. 29, 2012, the entirety of which is incorporated herein by reference.

FIELD OF THE INVENTION

The present invention relates to exhaust systems for snowmobiles.

BACKGROUND

In snowmobiles, the muffler has conventionally been placed to the right side of the engine. Although this position allows the muffler to operate properly, the cowling surrounding the engine and its components needs to be relatively wide in order to accommodate the muffler.

The muffler also defines a fairly large volume in order to reduce the noise generated by the engine, and includes a complex system of baffles, chambers and noise absorbing materials, all of which result in a relatively heavy muffler. By placing the muffler laterally to the right of the longitudinal centerline of the snowmobile, the muffler generates a moment of inertia about the longitudinal centerline of the snowmobile which can have an adverse effect on the handling characteristics of the snowmobile.

In order to address this issue, in some snowmobiles, the muffler has been positioned completely in front of the engine compartment. In some snowmobiles having a four-stroke engine, the muffler has also been positioned at a rear of the tunnel. While these positions of the muffler have a better lateral distribution of the weight of the muffler about the longitudinal centerline of the snowmobile, the muffler is then completely in front of or behind the center of gravity of the snowmobile, thus increasing the moment of inertia about a lateral axis passing through the center of gravity, which can also have an adverse effect on the handling characteristics of the snowmobile.

Therefore, there is a need for a snowmobile having a muffler positioned so as to reduce moments of inertia resulting from the weight of the muffler.

SUMMARY

It is an object of the present invention to ameliorate at least some of the inconveniences present in the prior art.

In one aspect, a snowmobile has a frame including a tunnel, a least one ski operatively connected to the frame, a seat disposed above the tunnel, a fuel tank disposed on the frame, and an engine connected to the frame. The engine is disposed forwardly of the fuel tank. The engine has at least one cylinder, at least one intake port fluidly communicating with the at least one cylinder, at least one exhaust port fluidly communicating with the at least one cylinder, and a laterally extending output shaft defining an output shaft axis. An endless track is disposed at least in part under the tunnel and is operatively connected to the engine. An air intake system is fluidly connected to the at least one intake port. An exhaust system is fluidly connected to the at least one exhaust port. The exhaust system includes a muffler. The muffler is disposed between the output shaft axis and the fuel tank in a longitudinal direction of the snowmobile.

In a further aspect, the muffler passes through a vertical plane containing a longitudinal centerline of the snowmobile.

In an additional aspect, the muffler is completely disposed between the engine and the fuel tank in the longitudinal direction of the snowmobile.

In a further aspect, the at least one exhaust port is disposed on a front of the engine and the at least one intake port is disposed on a back of the engine.

In an additional aspect, a laterally extending countershaft defines a countershaft axis. A continuously variable transmission has a driving pulley connected to the output shaft, a driven pulley connected to the countershaft, and a belt transmitting power from the driving pulley to the driven pulley. A drive axle defines a drive axle axis and is operatively connected to the countershaft and the endless track. The exhaust system further includes an exhaust pipe having an inlet fluidly communicating with the muffler and an outlet fluidly communicating with atmosphere. The outlet of the exhaust pipe and the continuously variable transmission are disposed on a same side of a longitudinal centerline of the snowmobile.

In a further aspect, at least a portion of the air intake system is disposed between the engine and the muffler in the longitudinal direction of the snowmobile.

In an additional aspect, the at least one exhaust port and the at least one intake port are disposed on a front of the engine.

In a further aspect, a laterally extending countershaft defines a countershaft axis. A continuously variable transmission has a driving pulley connected to the output shaft, a driven pulley connected to the countershaft, and a belt transmitting power from the driving pulley to the driven pulley. A drive axle defines a drive axle axis and is operatively connected to the countershaft and the endless track. The exhaust system further includes an exhaust pipe having an inlet fluidly communicating with the muffler and an outlet fluidly communicating with atmosphere. The outlet of the exhaust pipe and the continuously variable transmission are disposed on a same side of a longitudinal centerline of the snowmobile.

In an additional aspect, the at least one cylinder is at least two cylinders. Each of the at least two cylinders has a cylinder axis. At least a portion of the muffler is disposed between two longitudinally extending vertical planes. One of the two longitudinally extending vertical planes contains one of the cylinder axes. Another one of the two longitudinally extending vertical planes contains another one of the cylinder axes.

In a further aspect, the fuel tank is disposed on a front of the tunnel.

In another aspect, a heat shield is disposed between the fuel tank and the muffler.

In a further aspect, a laterally extending countershaft defines a countershaft axis. A continuously variable transmission has a driving pulley connected to the output shaft, a driven pulley connected to the countershaft, and a belt transmitting power from the driving pulley to the driven pulley. A drive axle defines a drive axle axis and is operatively connected to the countershaft and the endless track. The countershaft axis is disposed between the muffler and the output shaft axis in the longitudinal direction of the snowmobile.

In an additional aspect, a reduction gearing operatively connects the countershaft to the drive axle. The reduction gearing and continuously variable transmission are disposed on opposite sides of a longitudinal centerline of the snowmobile.

In a further aspect, the muffler is disposed between the countershaft axis and the drive axle axis.

In an additional aspect, the at least one exhaust port is disposed on a front of the engine. The exhaust system further includes: a tuned pipe fluidly connected to the at least one exhaust port, and an exhaust conduit fluidly connecting the tuned pipe to the muffler.

In a further aspect, the tuned pipe has an inlet, a first portion, a second generally U-shaped portion, a third portion and an outlet. The first portion is connected to the inlet. The first portion extends from the inlet forwardly and laterally in a first direction from the inlet. The second generally U-shaped portion is connected to the first portion. The second portion extends forwardly from the first portion, then laterally in a second direction across a longitudinally extending line passing through the inlet, and then rearwardly. The second direction is opposite the first direction. The third portion is connected to the second portion. The third portion extends rearwardly and laterally in the first direction from the second portion to the outlet of the tuned pipe. The third portion extends across the longitudinally extending line passing through the inlet. The exhaust conduit is connected to the outlet of the tuned pipe. The exhaust conduit extends rearwardly from the outlet of the tuned pipe to the muffler.

In an additional aspect, the exhaust system further includes an exhaust pipe having an inlet fluidly communicating with the muffler and an outlet fluidly communicating with atmosphere. The outlet faces downwardly and is disposed between the output shaft axis and the fuel tank in the longitudinal direction of the snowmobile.

In a further aspect, the exhaust system further includes an exhaust pipe having an inlet fluidly communicating with the muffler and an outlet fluidly communicating with atmosphere. The outlet of the exhaust pipe is disposed laterally between the lateral sides of the engine.

In another aspect, a snowmobile has a frame including a tunnel, a least one ski operatively connected to the frame, a seat disposed above the tunnel, and an engine connected to the frame. The engine is disposed forwardly of the fuel tank. The engine has at least one cylinder, at least one intake port fluidly communicating with the at least one cylinder, at least one exhaust port fluidly communicating with the at least one cylinder, and a laterally extending output shaft defining an output shaft axis. A drive axle is operatively connected to the output shaft and defines an output shaft axis. An endless track is disposed at least in part under the tunnel and around the drive axle. The endless track is operatively connected to the drive axle. An air intake system is fluidly connected to the at least one intake port. An exhaust system is fluidly connected to the at least one exhaust port. The exhaust system includes a muffler. The muffler is disposed between the output shaft axis and the drive axle axis in a longitudinal direction of the snowmobile.

In an additional aspect, the muffler passes through a vertical plane containing a longitudinal centerline of the snowmobile.

In a further aspect, the muffler is completely disposed between the engine and the drive axle axis in the longitudinal direction of the snowmobile.

In an additional aspect, the at least one exhaust port is disposed on a front of the engine and the at least one intake port is disposed on a back of the engine.

In a further aspect, at least a portion of the air intake system is disposed between the engine and the muffler in the longitudinal direction of the snowmobile.

In an additional aspect, the at least one exhaust port and the at least one intake port are disposed on a front of the engine.

In a further aspect, the at least one cylinder is at least two cylinders. Each of the at least two cylinders has a cylinder axis. At least a portion of the muffler is disposed between two longitudinally extending vertical planes. One of the two longitudinally extending vertical planes contains one of the cylinder axes. Another one of the two longitudinally extending vertical planes contains another one of the cylinder axes.

In an additional axis, a laterally extending countershaft defines a countershaft axis. A continuously variable transmission has a driving pulley connected to the output shaft, a driven pulley connected to the countershaft, and a belt transmitting power from the driving pulley to the driven pulley. The drive axle is operatively connected to the countershaft. The countershaft axis is disposed between the muffler and the output shaft axis in the longitudinal direction of the snowmobile.

In a further aspect, a reduction gearing operatively connects the countershaft to the drive axle. The reduction gearing and continuously variable transmission are disposed on opposite sides of a longitudinal centerline of the snowmobile.

In an additional aspect, the muffler is disposed between the countershaft axis and the drive axle axis.

In a further aspect, the at least one exhaust port is disposed on a front of the engine. The exhaust system further includes: a tuned pipe fluidly connected to the at least one exhaust port, and an exhaust conduit fluidly connecting the tuned pipe to the muffler.

In an additional aspect, the tuned pipe has an inlet, a first portion, a second generally U-shaped portion, a third portion and an outlet. The first portion is connected to the inlet. The first portion extends from the inlet forwardly and laterally in a first direction from the inlet. The second generally U-shaped portion is connected to the first portion. The second portion extends forwardly from the first portion, then laterally in a second direction across a longitudinally extending line passing through the inlet, and then rearwardly. The second direction is opposite the first direction. The third portion is connected to the second portion. The third portion extends rearwardly and laterally in the first direction from the second portion to the outlet of the tuned pipe. The third portion extends across the longitudinally extending line passing through the inlet. The exhaust conduit is connected to the outlet of the tuned pipe. The exhaust conduit extends rearwardly from the outlet of the tuned pipe to the muffler.

In a further aspect, the exhaust system further includes an exhaust pipe having an inlet fluidly communicating with the muffler and an outlet fluidly communicating with atmosphere. The outlet faces downwardly and is disposed between the output shaft axis and the drive axle axis in the longitudinal direction of the snowmobile.

In an additional aspect, the exhaust system further includes an exhaust pipe having an inlet fluidly communicating with the muffler and an outlet fluidly communicating with atmosphere. The outlet of the exhaust pipe is disposed laterally between the lateral sides of the engine.

For purposes of this application, terms related to spatial orientation such as forwardly, rearwardly, upwardly, downwardly, left, and right, are as they would normally be understood by a driver of the vehicle sitting thereon in a normal riding position.

Embodiments of the present invention each have at least one of the above-mentioned object and/or aspects, but do not necessarily have all of them. It should be understood that some aspects of the present invention that have resulted from attempting to attain the above-mentioned object may not satisfy this object and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 9 is a front elevation view of the engine, the portion of the air intake system and exhaust system of the snowmobile of FIG. 1;

FIG. 10 is a rear elevation view of the engine, the portion of the air intake system and exhaust system of the snowmobile of FIG. 1;

FIG. 11 is a left side elevation view of the portion of the frame, an alternative embodiment of a power pack and associated components of the snowmobile of FIG. 1 with a continuously variable transmission removed;

FIG. 12 is a left side elevation view of the engine of the power pack of FIG. 11, and the exhaust system of the snowmobile of FIG. 1; and FIG. 13 is a left side elevation view of the portion of the frame, another alternative embodiment of a power pack and associated components of the snowmobile of FIG. 1 with a continuously variable transmission removed.

DETAILED DESCRIPTION

Figure 1:
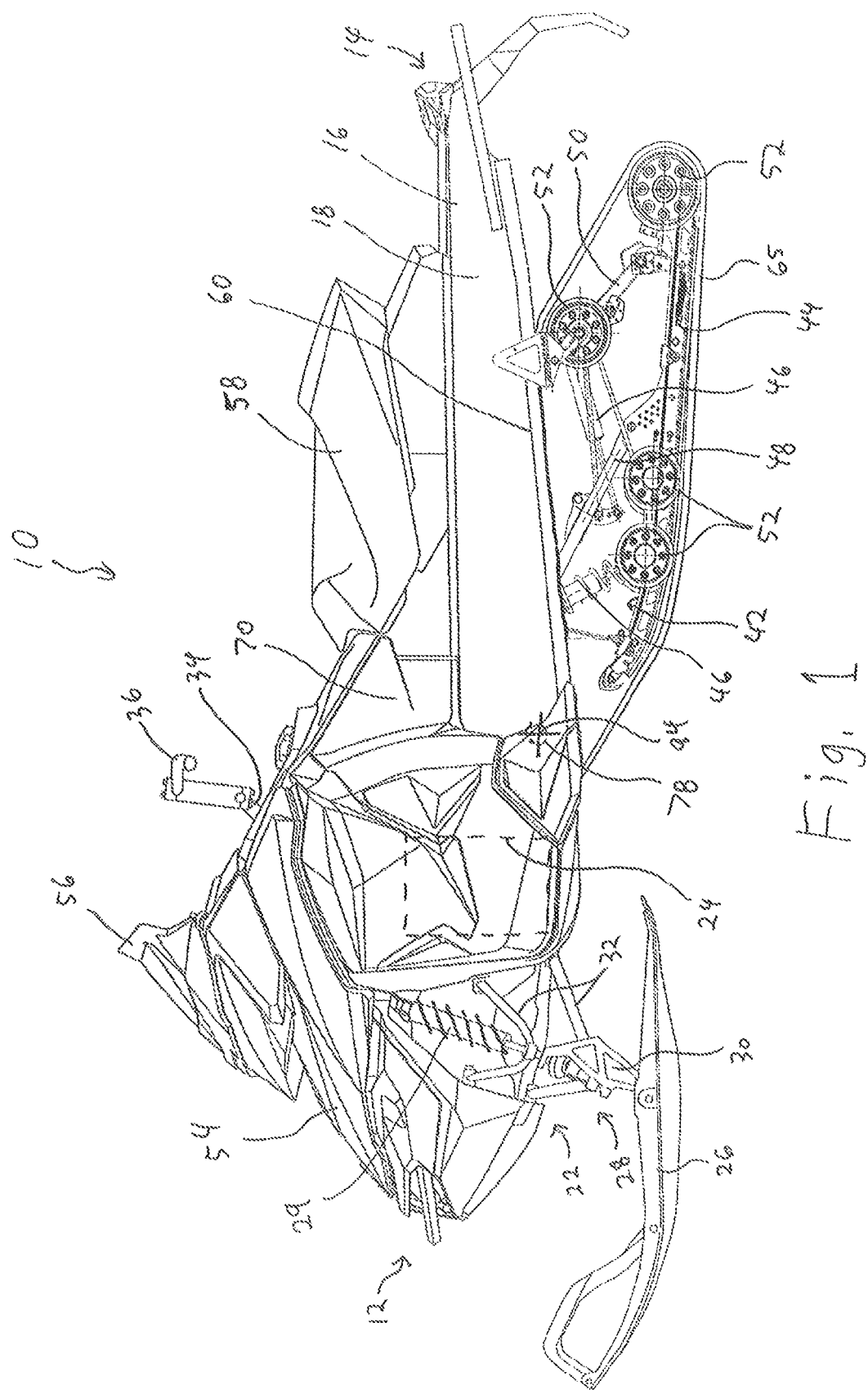
FIG. 1 is a left side elevation view of a snowmobile.
Figure 2:
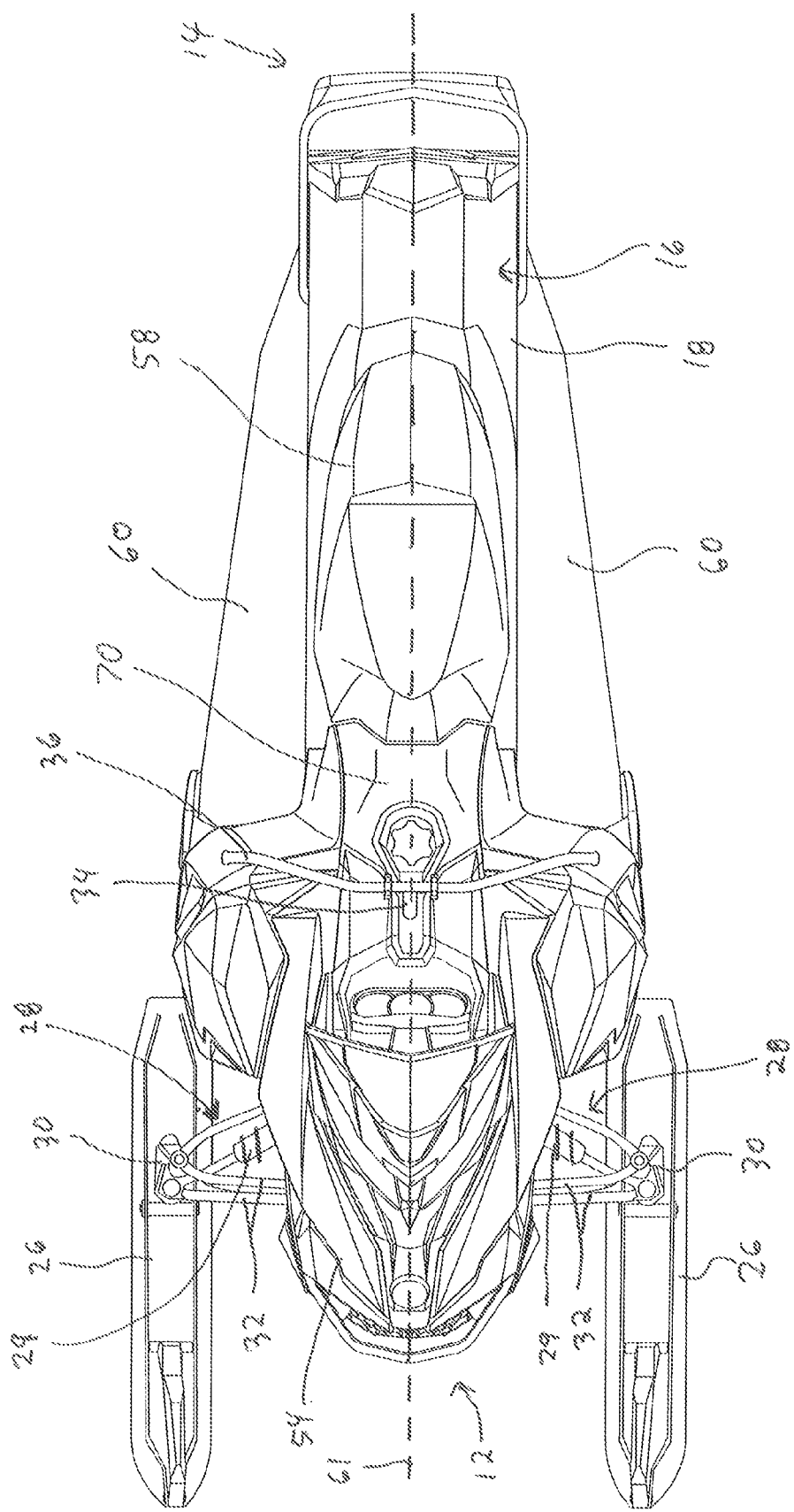
FIG. 2 is a top plan view of the snowmobile of FIG. 1.
Figure 4:
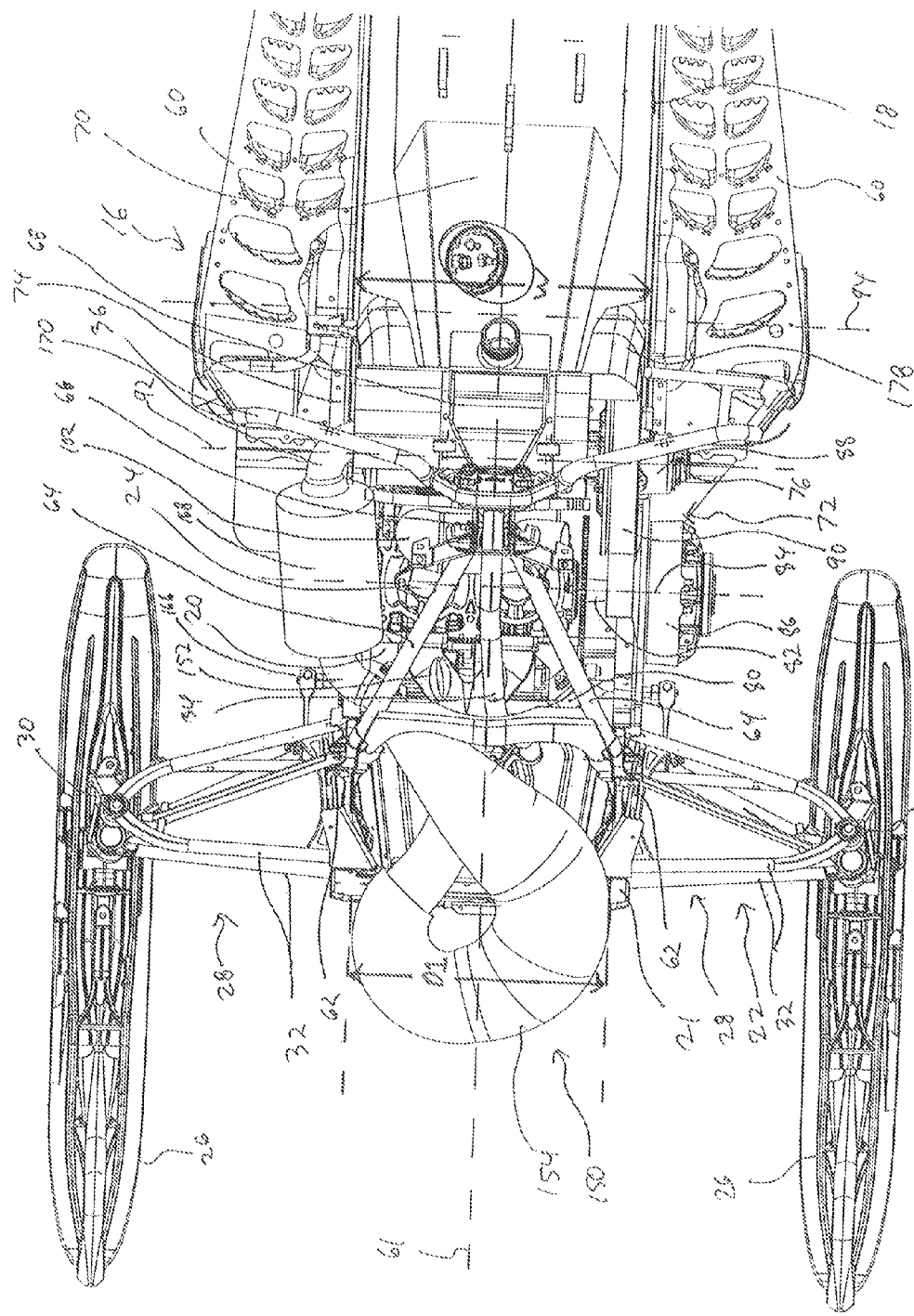
FIG. 4 is a top plan view of the portion of the frame, power pack and associated components of the snowmobile of FIG. 1.

As can be seen in FIGS. 1 and 2, a snowmobile 10 includes a forward end 12 and a rearward end 14 that are defined consistently with a travel direction of the snowmobile 10. The snowmobile 10 includes a frame 16 that includes a tunnel 18, an engine cradle 20 and a suspension module 21 as described in greater detail below. A front suspension 22 is connected to the suspension module. The tunnel 18 generally consists of one or more pieces of sheet metal bent to form an inverted U-shape. As can be seen in FIG. 4, the tunnel 18 has a width W. The tunnel 18 extends rearwardly along the longitudinal centerline 61 of the snowmobile 10 and is connected at the front to the engine cradle 20. An engine 24, which is schematically illustrated in FIG. 1, is mounted to the engine cradle 20 of the frame 16. Two skis 26 are positioned at the forward end 12 of the snowmobile 10 and are attached to the front suspension 22 through a pair of front suspension assemblies 28. Each front suspension assembly 28 includes a ski leg 30, a pair of A-arms 32 and a shock absorber 29 for operatively connecting the respective skis 26 to a steering column 34. Other types of front suspension assemblies 28 are contemplated, such as a swing-arm or a telescopic suspension. It is also contemplated that the snowmobile 10 could have only one ski 26. A steering device in the form of a handlebar 36, positioned forward of a rider, is attached to the upper end of the steering column 34 to allow the rider to rotate the ski legs 30 and thus the skis 26, in order to steer the snowmobile 10. U.S. Pat. No. 8,037,961, issued Oct. 18, 2011, the entirety of which is incorporated herein by reference, provides additional details regarding a steering assembly and front suspension assemblies suitable for the snowmobile 10.

An endless drive track 65 is positioned at the rear end 14 of the snowmobile 10. The endless drive track 65 is disposed generally under the tunnel 18, and is operatively connected to the engine 24 as will be described in greater detail below. The endless drive track 65 is driven to run about a rear suspension assembly 42 for propelling the snowmobile 10. The rear suspension assembly 42 includes a pair of slide rails 44 in sliding contact with the endless drive track 65. The rear suspension assembly 42 also includes two shock absorbers 46, which may further include a coil spring (not shown) surrounding the individual shock absorbers 46. Suspension arms 48 and 50 are provided to attach the slide rails 44 to the frame 16. Multiple idler wheels 52 are also provided in the rear suspension assembly 42.

At the front end 12 of the snowmobile 10, fairings 54 enclose the engine 24, thereby providing an external shell protecting the engine 24 and its associated components. The fairings 54 include a hood and side panels that can be opened to allow access to the engine 24 when this is required, for example, for inspection or maintenance of the engine 24. In the particular snowmobile 10 shown in FIG. 1, the side panels can be opened along a vertical axis to swing away from the snowmobile 10. A windshield 56 is connected to the fairings 54 near the front end 12 of the snowmobile 10 or alternatively directly to the handlebar 36. The windshield 56 acts as a windscreen to lessen the force of the air on the rider while the snowmobile 10 is moving.

A straddle-type seat 58 is positioned atop the frame 16 and more specifically on the fuel tank 70. Two footrests 60 are positioned on opposite sides of the snowmobile 10 below the seat 58 to accommodate the driver's feet.

Figure 3:
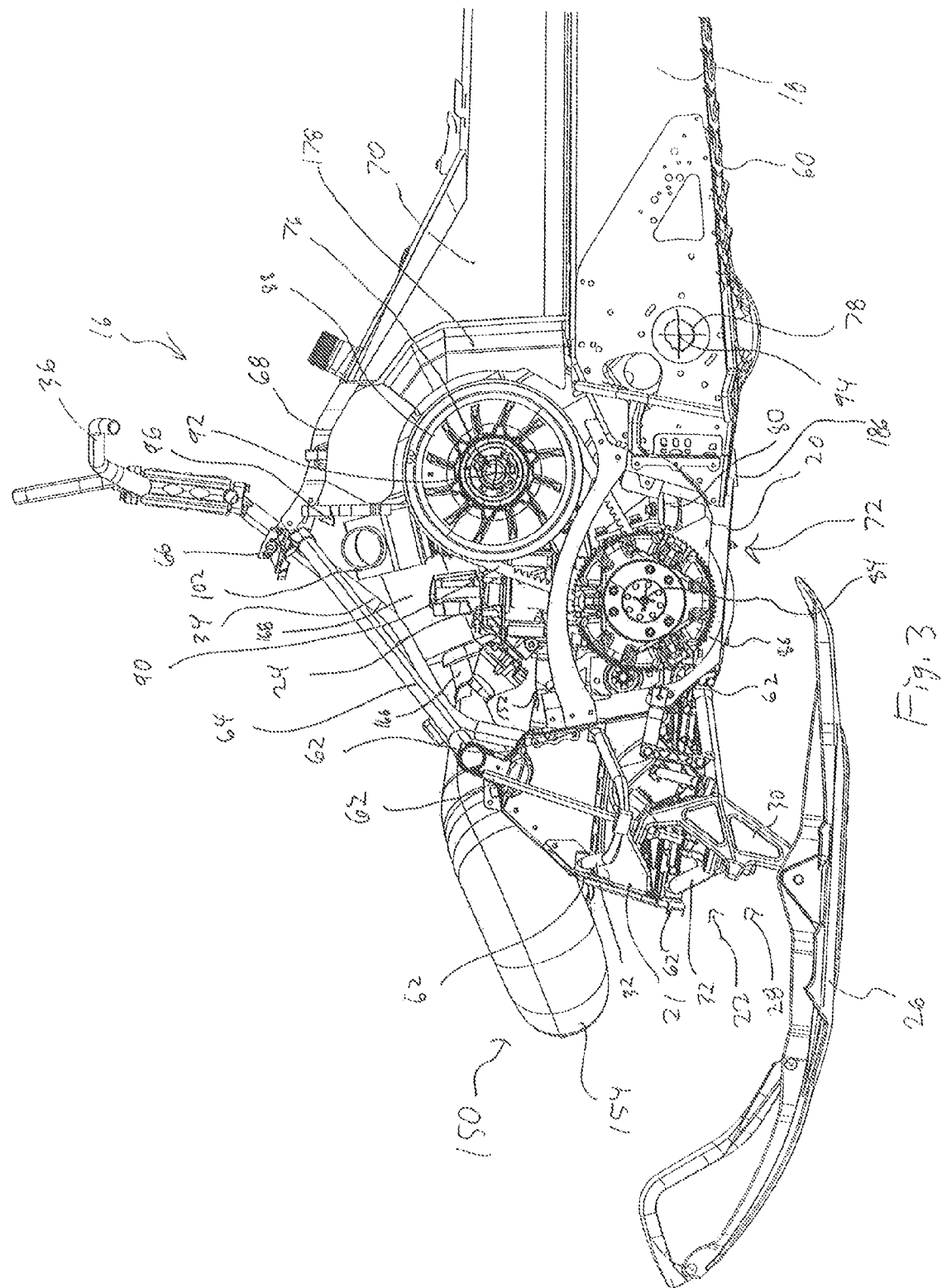
FIG. 3 is a left side elevation view of a portion of a frame, power pack and associated components of the snowmobile of FIG. 1.
Figure 5:
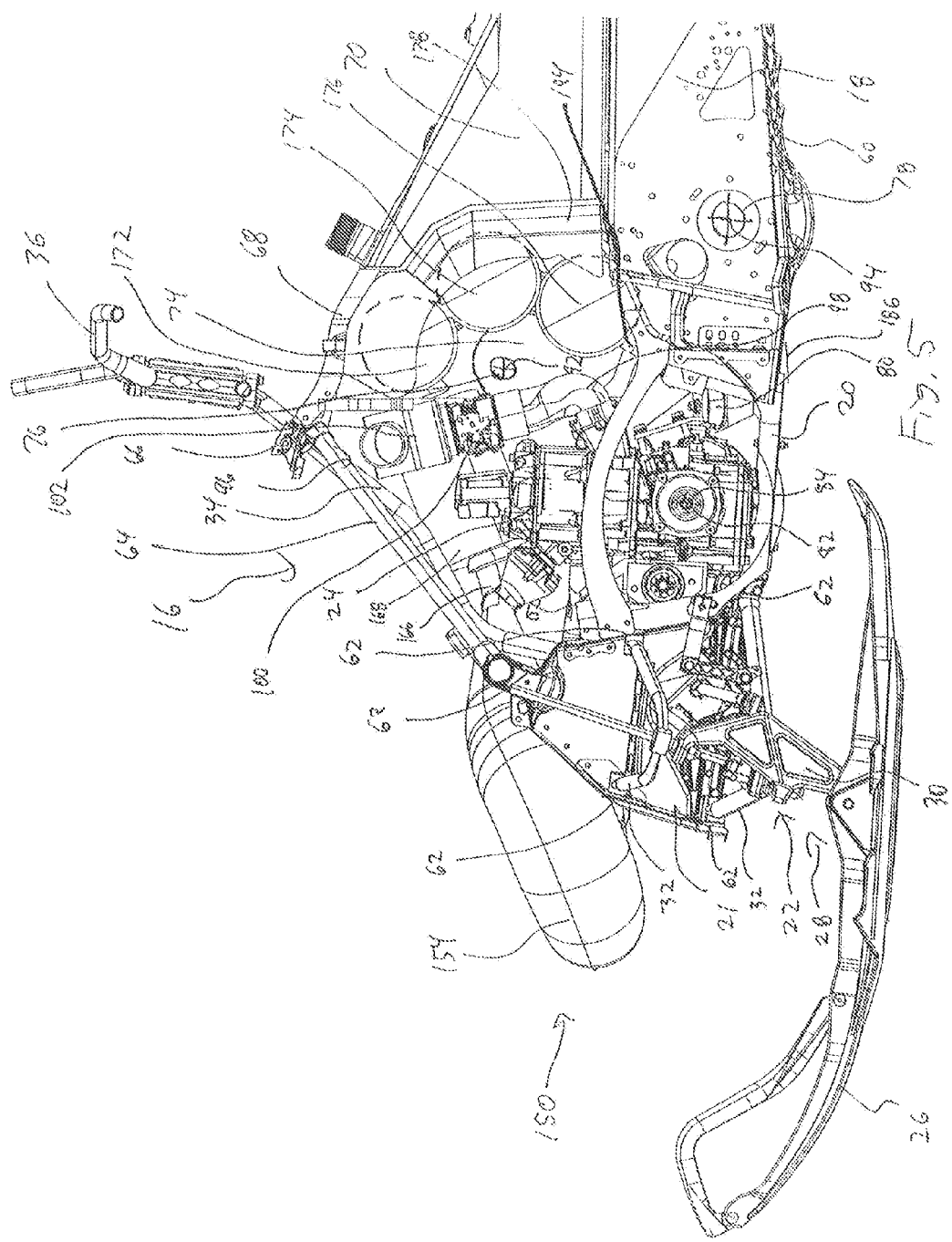
FIG. 5 is a left side elevation view of the portion of the frame, power pack and associated components of the snowmobile of FIG. 1 with a continuously variable transmission removed.

Turning now to FIGS. 3 to 5, the frame 16 will be described in more detail. The suspension module 21 is connected to the front of the engine cradle 20. The suspension module 21 provides a number of brackets 62 used to connect the A-arms 32 and shock absorbers 29 of the front suspension assemblies 28. Two frame members 64 are connected to the top of the sides of the suspension module 21 and extend upwardly, rearwardly and laterally inwardly therefrom to a top central bracket 66. The steering column 34 passes through the top central bracket 66. Another frame member 68 extends downwardly and rearwardly from the top central bracket 66 and connects to a top of a front end of a fuel tank 70 of the snowmobile 10. The frame members 64 and 68 and the top central bracket 66 form together a pyramidal-like structure that enhances the torsional and structural rigidity of the frame 16. The fuel tank 70 is connected to the top of the tunnel 18 at a front thereof. In the present embodiment, the fuel tank 70 is made of rigid material that allows it to support and transfer loads between the tunnel 18 and the frame member 68. As such, in the present embodiment, the fuel tank 70 forms part of the frame 16. It is contemplated that the fuel tank 70 could be separate from the frame 16 and not bear the structural loads applied to the frame 16. In such an embodiment, the fuel tank 70 would be located in the same position, but the frame member 68 would not be connected to the fuel tank 70 as shown. Instead, the frame member 68 could be replaced with two frame members extending downwardly, rearwardly and outwardly from the top central bracket 66 and be connected at their lower ends to the tunnel 18 such that the fuel tank 70 is disposed laterally between these frame members. It is contemplated that the fuel tank 70 could be disposed elsewhere on the frame 16 rearwardly of the engine 24. The frame 16 has other elements and features not described herein for simplicity.

A power pack for powering the endless drive track 65 will now be described with reference to FIGS. 3 to 5. The power pack includes, but is not limited to, the engine 24, a variable ratio belt transmission system, also known as a continuously variable transmission or CVT 72, a reduction gearing 74, a countershaft 76 and a drive axle 78.

The engine 24 is a two-cylinder, two-cycle internal combustion engine. It is contemplated that the engine 24 could be of any other type, such as a four-cycle internal combustion engine. The engine 24 is disposed transversely in the engine cradle 20 and rests on vibration dampers 80 to reduce the transmission of vibrations from the engine 24 to the frame 16. The vibration dampers 80 are rubber mounts. The engine 24 comprises a crankshaft (not shown) that is integrally formed with an output shaft 82. The crankshaft and output shaft 82 rotate about a horizontally disposed output shaft axis 84 that extends generally transversely to the longitudinal centerline 61 of the snowmobile 10. It is contemplated that the crankshaft and output shaft 82 could be separate shafts disposed coaxially such that the crankshaft drives the output shaft 82. It is also contemplated that the crankshaft and output shaft 82 could be separate shafts that are offset from one another and could also rotate at different speeds relative to one another.

As can be seen in FIGS. 3 and 4, the CVT 72 is disposed on a left side of the engine 24 and includes a driving pulley 86 coupled to rotate with the output shaft 82 of the engine 24 and a driven pulley 88 coupled to the left end of the transversely mounted countershaft 76 to rotate with the countershaft 76. A drive belt 90 disposed around the pulleys 86, 88 transmits power from the driving pulley 86 to the driven pulley 88. The driving pulley 88 includes a pair of opposed frustoconical belt drive sheaves (one fixed sheave and one moving sheave) between which the drive belt 90 is located. The sheaves are biased apart, and the driving pulley 86 incorporates a centrifugally operated mechanism that acts to urge the moving sheave towards the fixed sheave with a force that increases with increasing output shaft speed so that as the engine speed increases, the reduction ratio of the CVT 72 decreases. The driven pulley 88 includes a pair of frustoconical belt drive sheaves between which the drive belt 90 is located. The driven pulley 88 reacts to the torque from the endless drive track 65 by separation of its sheaves which allows the drive belt 90 to engage the driven pulley 88 at a diameter that is progressively reduced as the torque increases or that is progressively increased as the torque decreases. When the driving pulley 86 increases its diameter, the driven pulley 88 decreases its effective diameter and vice versa, thus keeping the drive belt 90 in tension. The drive belt 90 is made of rubber, but it is contemplated that it could be made of metal.

As can be seen, the countershaft 76 traverses the width of the engine cradle 20, is disposed rearwardly of the engine 24 and defines a countershaft axis 92. The reduction gearing 74 is disposed on a right side of the engine 24. The right end of the countershaft 76 is connected to an input member of the reduction gearing 74. The input member of the reduction gearing 74 consists of a small sprocket (not shown) connected to the countershaft 76. An output member of the reduction gearing 74 is connected to the drive axle 78. The output member consists of a sprocket (not shown) that is larger than the sprocket of the input member and is connected to the drive axle 78. The output member is driven via a chain (not shown) by the input member. It is also contemplated that the output member could be driven via gears by the input member. The input member, the output member, and the chain are enclosed within the housing of the reduction gearing 74. The drive axle 78 is disposed in the tunnel 18 and carries sprocket wheels (not shown) that form a driving connection with the endless drive track 65. The drive axle 78 defines a drive axle axis 94.

It is contemplated that the reduction gear 74 could be disposed on the left side of the engine 24 and that the CVT 72 could be disposed on the right side of the engine 24.

The driving pulley 86 rotates at the same speed as the output shaft 82. The speed of rotation of the countershaft 76 is determined in accordance with the instantaneous ratio of the CVT 72. The drive axle 78 rotates at a lower speed than the countershaft 76 since the reduction gearing 74 has a reduction ratio.

The engine 24 has two air intake ports (one per cylinder) on a rear side thereof that fluidly communicate with the cylinders of the engine 24. An air intake system 96 is connected to the air intake ports to supply air to the engine 24. As can be seen in FIG. 5, the air intake system 96 includes an air intake manifold 98, an air intake controller 100 and an air box 102 (completely shown in FIG. 6 and only a lower portion of which is shown in the other figures). The air intake manifold 98 is connected to the rear side of the engine 24 so as to fluidly communicate with the air intake ports. As can be seen in FIG. 5, the air intake manifold 98 extends upwardly from the air intake ports so as to be disposed between the countershaft 76 and the engine 24 in a longitudinal direction of the snowmobile 10. The air intake controller 100 is connected to the top of the air intake manifold 98. It is contemplated that two intake controllers 100 could be used. The air intake controller 100 includes a valve (not shown) that controls the flow of air to the engine 24. It is contemplated that the air control devices could be in the form of a carburetor or a throttle body. The air box 102 is connected to the top of the air intake controller 100. The air box 102 defines the inlet (not shown) of the air intake system 96. The inlets 104 (FIG. 6) of the air intake system 96 faces toward a left of the snowmobile 10. The air box 102 has an air filter (not shown) disposed inside of it.

The engine 24 has two exhaust ports (one per cylinder) disposed on a front side of the engine 24 that fluidly communicate with the cylinders of the engine 24. An exhaust system 150 fluidly communicates with the engine 24 to exhaust the gases from the combustion process. The exhaust system 150 will now be described in more detail with reference to FIGS. 5 to 10. The exhaust system 150 has an exhaust manifold 152 connected to the front of the engine 24 to fluidly communicate with the two exhaust ports. An outlet of the exhaust manifold 152 is connected to an inlet of a tuned pipe 154. The tuned pipe 154 has a diverging portion 156 connected to a generally U-shaped diverging portion 158 that is connected to a converging portion 160. The diverging portion 156 extends forwardly and to the right from the inlet of the tuned pipe 154. The generally U-shaped diverging portion 158 extends forwardly from the diverging portions 156, then left across a longitudinally extending line 162 (FIG. 8) passing through the inlet of the tuned pipe 154, and then rearwardly. The converging portion 160 extends rearwardly, upwardly and to the right across the line 162 from the U-shaped diverging portion 158 to an outlet of the tuned pipe 154. As can be seen in FIG. 4, the tuned pipe 154 has a width that is smaller than a width W of the tunnel 18. The tuned pipe 154 is disposed laterally between vertical planes (not shown) containing the side walls of the tunnel 18.

An exhaust conduit 164 is connected to the outlet of the tuned pipe 154 and extends rearwardly and upwardly therefrom. As can be seen, the majority of the exhaust conduit 164 is disposed to the right of the engine 24 and of the tuned pipe 154. The exhaust conduit 164 includes a curved exhaust pipe 166, a muffler 168 and another curved exhaust pipe 170. It is contemplated that the muffler 168 could be replaced with an exhaust pipe.

Figure 6:
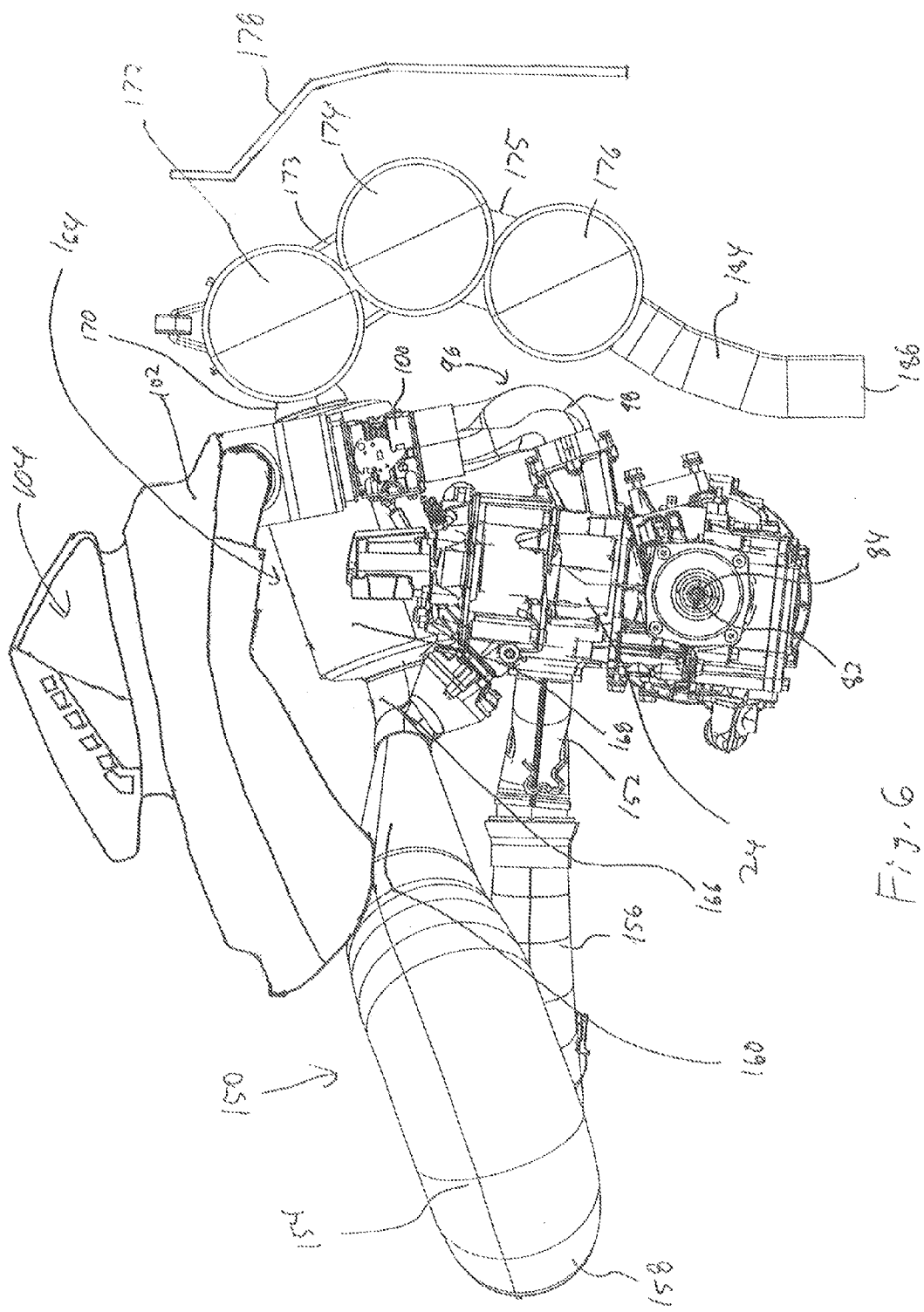
FIG. 6 is a left side elevation view of the engine, the air intake system and exhaust system of the snowmobile of FIG. 1.
Figure 7:
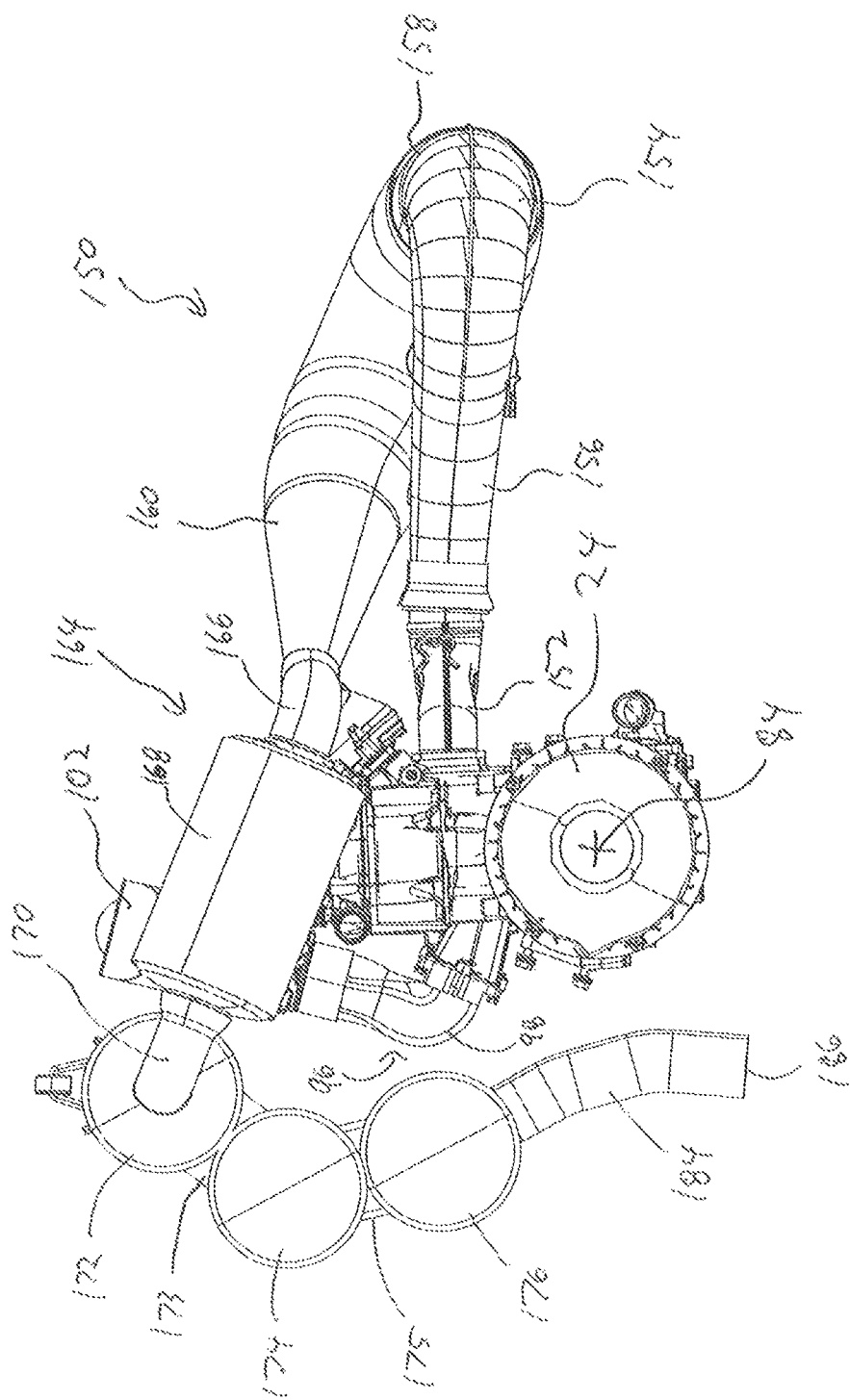
FIG. 7 is a right side elevation view of the engine, a portion of the air intake system and exhaust system of the snowmobile of FIG. 1.
Figure 8:
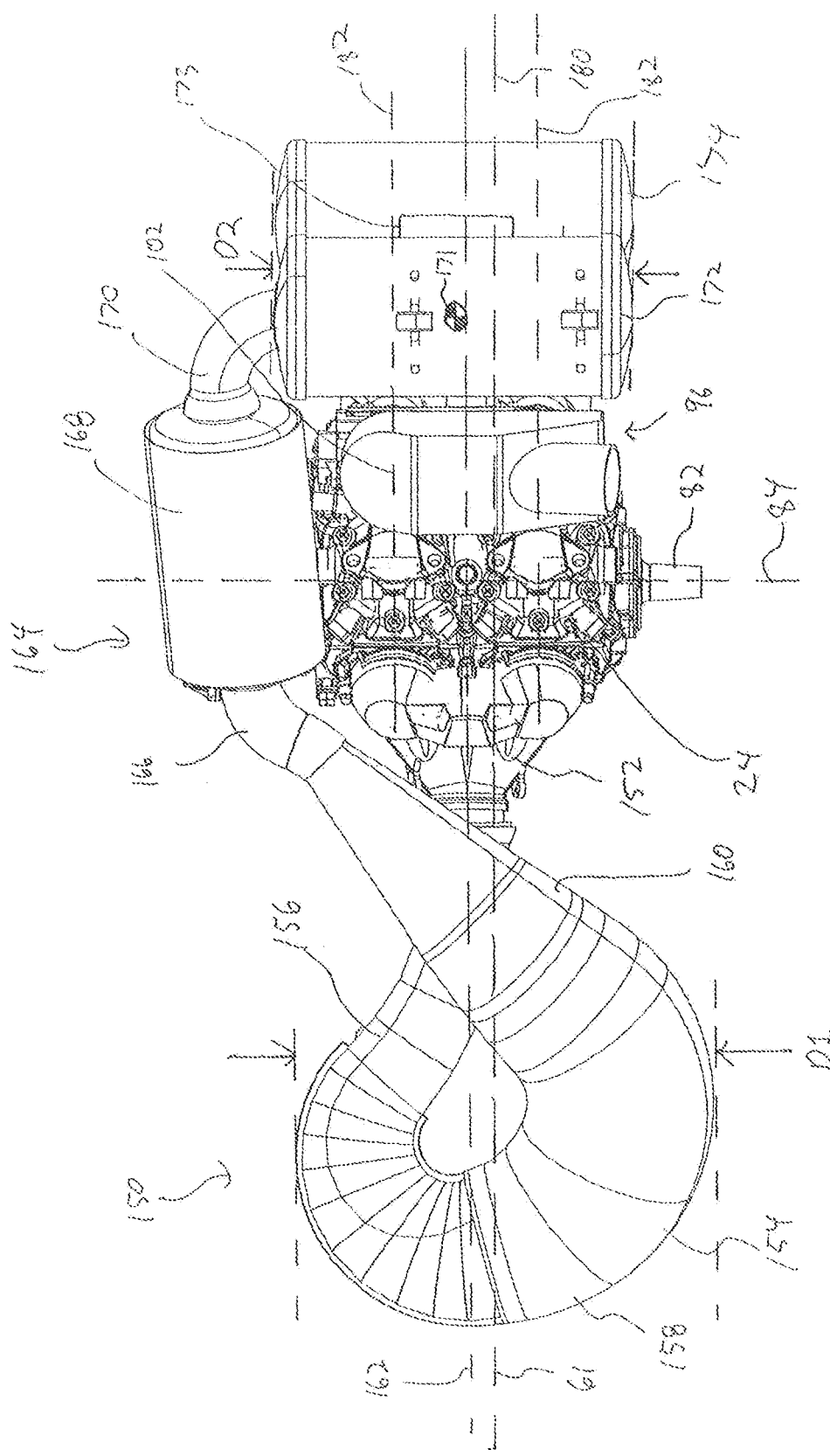
FIG. 8 is a top plan view of the engine, the portion of the air intake system and exhaust system of the snowmobile of FIG. 1.

The exhaust pipe 170 is connected to a right end of a muffler 172. As can be seen in FIG. 8, the majority of the exhaust conduit 164 is disposed to the right of the muffler 172. The muffler 172 is connected by a pipe 173 to a muffler 174 disposed below and rearwardly of the muffler 172. The muffler 174 is connected by a pipe 175 to a muffler 176 disposed below and forwardly of the muffler 174. As a result, as can be seen in FIGS. 5 to 7, the mufflers 172, 174, 176 are arranged in an arcuate pattern. As can be seen in FIG. 5, the mufflers 172 and 174 are completely disposed vertically higher than a top of a front portion of the tunnel 18 and the muffler 176 is partially disposed vertically higher than the top of the front portion of the tunnel 18. As can also be seen in FIG. 5, the mufflers 172, 174, 176 are completely disposed between the fuel tank 70 and the engine 24 (and therefore the output shaft axis 84) in a longitudinal direction of the snowmobile 10. The mufflers 172, 174, 176 are also completely disposed between the drive axle axis 94 and the engine 24 (and therefore the output shaft axis 84) in a longitudinal direction of the snowmobile 10. The mufflers 174 and 176 are completely disposed between the fuel tank 70 and the countershaft axis 92 and between the drive axle axis 94 and the countershaft axis 92 in the longitudinal direction of the snowmobile 10. The muffler 172 is partially disposed between the fuel tank 70 and the countershaft axis 92 and between the drive axle axis 94 and the countershaft axis 92 in the longitudinal direction of the snowmobile. The countershaft axis 92 is disposed between the mufflers 174, 176 and the output shaft axis 84 in the longitudinal direction of the snowmobile 10. The air intake manifold 98 is disposed between the mufflers 172, 174, 176 and the engine 24 in the longitudinal direction of the snowmobile 10. A heat shield 178 (FIGS. 3 to 6) is disposed between the fuel tank 70 and the mufflers 172, 174, 176 in the longitudinal direction of the snowmobile 10. The heat shield 178 has two forwardly extending sides (not shown in FIG. 6 for clarity) between which the mufflers 172, 174, 176 are disposed in a lateral direction of the snowmobile 10.

As best seen in FIGS. 8 and 10, the mufflers 172, 174, 176 extend laterally across a vertical plane 180 containing the longitudinal centerline 61 of the snowmobile 10. Also, each of the mufflers 172, 174, 176 has a portion disposed between the two longitudinally extending vertical planes 182 containing the cylinder axes of the cylinders of the engine 24. The center of gravity of each of the mufflers 172, 174, 176 (only the center of gravity 171 of the muffler 172 being shown in FIG. 8) is also disposed between the two planes 182. In embodiments where then engine 24 has more than two cylinders, each of the mufflers 172, 174, 176 has a portion disposed between the two longitudinally extending vertical planes 182 containing the cylinder axes of the left and right outermost cylinders of the engine 24. The mufflers 172, 174, 176 are disposed laterally between vertical planes (not shown) containing the side walls of the tunnel 18. As can be seen in FIG. 8, the width D1 of the tuned pipe 154 is greater than the width D2 of the mufflers 172 and 174. The width W of the tunnel 18 is also greater than the width of the mufflers 172, 174, 176. As can be seen in FIG. 10, the muffler 176 is narrower than the mufflers 172 and 174.

By positioning the mufflers 172, 174, 176 as shown, they are in proximity to the center of gravity of the snowmobile 10 thus reducing a moment of inertia generated by the mufflers 172, 174, 176 about a lateral axis passing through the center of gravity. Also, since the mufflers 172, 174, 176 also cross the longitudinal centerline 61, a moment of inertia generated by the mufflers 172, 174, 176 about the longitudinal centerline 61 is reduced.

It is contemplated that the mufflers 172, 174, 176 could be replaced by a single muffler defining therein multiple chambers and/or baffles. It is also contemplated that one of the mufflers 172, 174, 176 could be omitted or that additional mufflers could be added.

An exhaust pipe 184 has an inlet connected to a bottom left side of the muffler 176. The exhaust pipe 184 extends downwardly and forwardly from the muffler 176. The outlet 186 of the exhaust pipe 184 is disposed below the engine cradle 20 and faces downwardly to communicate the exhaust system 150 with the atmosphere. In a lateral direction, the outlet 186 of the exhaust pipe 184 is disposed laterally between the lateral sides of the engine 24 as can be seen in FIGS. 9 and 10. In a longitudinal direction of the snowmobile 10, the outlet 186 of the exhaust pipe 184 is disposed between the output shaft axis 84 and the fuel tank 70 and between the output shaft axis 84 and the drive axle axis 94.

In an alternative embodiment illustrated in FIGS. 11 and 12, the engine 24 is replaced with an engine 24'. For simplicity, elements that correspond to those described in the embodiment above have been labelled with the same reference numerals. The engine 24' is inclined rearwardly, thus moving even more weight toward the center of gravity of the snowmobile 10. The engine 24' has its air intake ports and exhaust ports on the front of the engine 24', with the air intake ports disposed below the exhaust ports. As such, in this embodiment, the air intake system 96 is replaced with an air intake system 96' extending forwardly of the engine 24' below the tuned pipe 154. Like the air intake system 96, the air intake system 96' has an air intake manifold 98', an air intake controller 100' and an air box 102' schematically shown in FIG. 12. The air intake manifold 98', the air intake controller 100' and the air box 102' are shaped to fit in the space defined between the tuned pipe 152, the suspension module 21, the fairings 54 and the engine 24'. In this embodiment, the exhaust system 150 has been replaced with an exhaust system 150'. The exhaust system 150' is identical to the exhaust system 150 except for the exhaust manifold 152 which has been replaced with an exhaust manifold 152' adapted to connect to the inclined engine 24'. It is contemplated that the tuned pipe 154 could be shaped differently in order to accommodate the air box 102'.

As can be seen in FIG. 12, a plane 188 containing both cylinder axes of the engine 24' and the output shaft axis 84 passes through the muffler 172. Although not specifically shown, both cylinder axes also pass through the muffler 172. As can also be seen in FIG. 12, the mufflers 174 and 176 are completely disposed between the plane 188 and the drive axle axis 94 in a longitudinal direction of the snowmobile 10.

FIG. 13 illustrates an alternative embodiment of the embodiment illustrated in FIGS. 11 and 12. For simplicity, elements that correspond to those described in the embodiments above have been labelled with the same reference numerals. In this embodiment, the exhaust system 150' has been replaced with an exhaust system 150". The exhaust system 150" is identical to the exhaust system 150' except for the exhaust conduit 164 which has been replaced by an exhaust conduit 164" and the mufflers 172, 174, 176 which have been replaced by a single muffler 190. The exhaust conduit 164" is an exhaust pipe that extends rearwardly and upwardly from the outlet of the tuned pipe 154 on a right side of the engine 24'. The other end of the exhaust conduit 164" is connected to the right side of the muffler 190 near a top thereof so as to fluidly communicate the tuned pipe 154 with the muffler 190. The muffler 190 has a number of chambers and/or baffles defined therein. The inlet of the exhaust pipe 184 has an inlet connected to the bottom left side of the muffler 190.

The muffler 190 is completely disposed between the fuel tank 70 and the output shaft axis 84 in a longitudinal direction of the snowmobile 10. The muffler 190 is also completely disposed between the drive axle axis 94 and the output shaft axis 84 in a longitudinal direction of the snowmobile 10. A majority of the muffler 190 is disposed between the fuel tank 70 and the countershaft axis 92 and between the drive axle axis 94 and the countershaft axis 92 in the longitudinal direction of the snowmobile 10. A majority of the muffler 190 is also disposed between the plane 188 and the drive axle axis 94 in the longitudinal direction of the snowmobile 10. The plane 188 passes through the upper portion of the muffler 190. The muffler 190 extends laterally across the vertical plane containing the longitudinal centerline 61 of the snowmobile 10. The muffler 190 has a portion disposed between the two longitudinally extending vertical planes containing the cylinder axes of the cylinders of the engine 24. A heat shield 178" is disposed between the fuel tank 70 and the muffler 190 in the longitudinal direction of the snowmobile 10. The heat shield 178" lacks the two forwardly extending sides of the heat shield 178, but it is contemplated that such sides could be provided.

By positioning the muffler 190 as shown, the center of gravity 192 of the muffler 190 is disposed higher than both the center of gravity 194 of the engine 24' and the center of gravity 196 of the snowmobile 10. The center of gravity 192 of the muffler 190 is also disposed between the center of gravity 194 of the engine 24' and the center of gravity 196 of the snowmobile 10 in a longitudinal direction of the snowmobile 10. The center of gravity 192 of the muffler 190 is also in proximity to the center of gravity 196 of the snowmobile 10 thus reducing a moment of inertia generated by the muffler 190 about a lateral axis passing through the center of gravity 196. Also, since the muffler 190 also crosses the longitudinal centerline 61, a moment of inertia generated by the muffler 190 about the longitudinal centerline 61 is reduced.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A snowmobile comprising:
a frame including a tunnel;
a least one ski operatively connected to the frame;
a seat disposed above the tunnel;
a fuel tank disposed on the frame;
an engine connected to the frame, the engine being disposed forwardly of the fuel tank, the engine having at least one cylinder, at least one intake port fluidly communicating with the at least one cylinder, at least one exhaust port fluidly communicating with the at least one cylinder, and a laterally extending output shaft defining an output shaft axis;
an endless track disposed at least in part under the tunnel and being operatively connected to the engine;
an air intake system fluidly connected to the at least one intake port; and
an exhaust system fluidly connected to the at least one exhaust port, the exhaust system including a muffler, the muffler being disposed between the output shaft axis and the fuel tank in a longitudinal direction of the snowmobile, the muffler passing through a vertical plane containing a longitudinal centerline of the snowmobile.

2. The snowmobile of claim 1, wherein the muffler is completely disposed between the engine and the fuel tank in the longitudinal direction of the snowmobile.

3. The snowmobile of claim 1, wherein the at least one exhaust port is disposed on a front of the engine and the at least one intake port is disposed on a back of the engine.

4. The snowmobile of claim 3, further comprising:
a laterally extending countershaft defining a countershaft axis;
a continuously variable transmission having a driving pulley connected to the output shaft, a driven pulley connected to the countershaft, and a belt transmitting power from the driving pulley to the driven pulley; and
a drive axle defining a drive axle axis and being operatively connected to the countershaft and the endless track;
wherein the exhaust system further includes an exhaust pipe having an inlet fluidly communicating with the muffler and an outlet fluidly communicating with atmosphere; and
wherein the outlet of the exhaust pipe and the continuously variable transmission are disposed on a same side of the longitudinal centerline of the snowmobile.

5. The snowmobile of claim 3, wherein at least a portion of the air intake system is disposed between the engine and the muffler in the longitudinal direction of the snowmobile.

6. The snowmobile of claim 1, wherein the at least one exhaust port and the at least one intake port are disposed on a front of the engine.

7. The snowmobile of claim 6, further comprising:
a laterally extending countershaft defining a countershaft axis;
a continuously variable transmission having a driving pulley connected to the output shaft, a driven pulley connected to the countershaft, and a belt transmitting power from the driving pulley to the driven pulley; and
a drive axle defining a drive axle axis and being operatively connected to the countershaft and the endless track;
wherein the exhaust system further includes an exhaust pipe having an inlet fluidly communicating with the muffler and an outlet fluidly communicating with atmosphere; and
wherein the outlet of the exhaust pipe and the continuously variable transmission are disposed on a same side of the longitudinal centerline of the snowmobile.

8. The snowmobile of claim 1, wherein the fuel tank is disposed on a front of the tunnel.

9. The snowmobile of claim 8, further comprising a heat shield disposed between the fuel tank and the muffler.

10. The snowmobile of claim 1, further comprising:
a laterally extending countershaft defining a countershaft axis;
a continuously variable transmission having a driving pulley connected to the output shaft, a driven pulley connected to the countershaft, and a belt transmitting power from the driving pulley to the driven pulley; and
a drive axle defining a drive axle axis and being operatively connected to the countershaft and the endless track;
wherein the countershaft axis is disposed between at least a portion of the muffler and the output shaft axis in the longitudinal direction of the snowmobile.

11. The snowmobile of claim 10, further comprising a reduction gearing operatively connecting the countershaft to the drive axle; and wherein the reduction gearing and continuously variable transmission are disposed on opposite sides of the longitudinal centerline of the snowmobile.

12. The snowmobile of claim 10, wherein the muffler is disposed between the countershaft axis and the drive axle axis.

13. The snowmobile of claim 1, wherein the at least one exhaust port is disposed on a front of the engine; and
the exhaust system further includes:
a tuned pipe fluidly connected to the at least one exhaust port; and
an exhaust conduit fluidly connecting the tuned pipe to the muffler.

14. The snowmobile of claim 13, wherein the tuned pipe has:
an inlet;
a first portion connected to the inlet, the first portion extending from the inlet forwardly and laterally in a first direction from the inlet;
a second generally U-shaped portion connected to the first portion, the second portion extending forwardly from the first portion, then laterally in a second direction across a longitudinally extending line passing through the inlet, the second direction being opposite the first direction, and then rearwardly; and
a third portion connected to the second portion, the third portion extending rearwardly and laterally in the first direction from the second portion to an outlet of the tuned pipe, the third portion extending across the longitudinally extending line passing through the inlet;
wherein the exhaust conduit is connected to the outlet of the tuned pipe; and
wherein the exhaust conduit extends rearwardly from the outlet of the tuned pipe to the muffler.

15. The snowmobile of claim 1, wherein the exhaust system further includes an exhaust pipe having an inlet fluidly communicating with the muffler and an outlet fluidly communicating with atmosphere; and
wherein the outlet faces downwardly and is disposed between the output shaft axis and the fuel tank in the longitudinal direction of the snowmobile.

16. The snowmobile of claim 1, wherein the exhaust system further includes an exhaust pipe having an inlet fluidly communicating with the muffler and an outlet fluidly communicating with atmosphere; and
wherein the outlet of the exhaust pipe is disposed laterally between lateral sides of the engine.

17. A snowmobile comprising:
a frame including a tunnel;
a least one ski operatively connected to the frame;
a seat disposed above the tunnel;
a fuel tank disposed on the frame;
an engine connected to the frame, the engine being disposed forwardly of the fuel tank, the engine having at least two cylinders, at least two intake ports fluidly communicating with the at least two cylinders, at least two exhaust ports fluidly communicating with the at least two cylinders, and a laterally extending output shaft defining an output shaft axis;
an endless track disposed at least in part under the tunnel and being operatively connected to the engine;
an air intake system fluidly connected to the at least two intake ports; and
an exhaust system fluidly connected to the at least two exhaust ports, the exhaust system including a muffler, the muffler being disposed between the output shaft axis and the fuel tank in a longitudinal direction of the snowmobile,
each of the at least two cylinders having a cylinder axis;
at least a portion of the muffler being disposed between two longitudinally extending vertical planes;
one of the two longitudinally extending vertical planes containing one of the cylinder axes; and
another one of the two longitudinally extending vertical planes containing another one of the cylinder axes.

18. The snowmobile of claim 17, wherein the muffler passes through a vertical plane containing a longitudinal centerline of the snowmobile.

19. The snowmobile of claim 17, wherein the muffler is completely disposed between the engine and the fuel tank in the longitudinal direction of the snowmobile.

20. A snowmobile comprising:
a frame including a tunnel;
a least one ski operatively connected to the frame;
a seat disposed above the tunnel;
an engine connected to the frame, the engine being disposed forwardly of the fuel tank, the engine having at least one cylinder, at least one intake port fluidly communicating with the at least one cylinder, at least one exhaust port fluidly communicating with the at least one cylinder, and a laterally extending output shaft defining an output shaft axis; a drive axle operatively connected to the output shaft and defining a drive axle axis;
an endless track disposed at least in part under the tunnel and around the drive axle, the endless track being operatively connected to the drive axle;
an air intake system fluidly connected to the at least one intake port; and
an exhaust system fluidly connected to the at least one exhaust port, the exhaust system including a muffler, the muffler being disposed between the output shaft axis and the drive axle axis in a longitudinal direction of the snowmobile, wherein the muffler passes through a vertical plane containing a longitudinal centerline of the snowmobile.

21. The snowmobile of claim 20, wherein the muffler is completely disposed between the engine and the drive axle axis in the longitudinal direction of the snowmobile.

22. The snowmobile of claim 20, wherein the at least one exhaust port is disposed on a front of the engine and the at least one intake port is disposed on a back of the engine.

23. The snowmobile of claim 22, wherein at least a portion of the air intake system is disposed between the engine and the muffler in the longitudinal direction of the snowmobile.

24. The snowmobile of claim 20, wherein the at least one exhaust port and the at least one intake port are disposed on a front of the engine.

25. The snowmobile of claim 20, wherein:
the at least one cylinder is at least two cylinders;
each of the at least two cylinders has a cylinder axis;
at least a portion of the muffler is disposed between two longitudinally extending vertical planes;
one of the two longitudinally extending vertical planes contains one of the cylinder axes; and
another one of the two longitudinally extending vertical planes contains another one of the cylinder axes.

26. The snowmobile of claim 20, further comprising: a laterally extending countershaft defining a countershaft axis; a continuously variable transmission having a driving pulley connected to the output shaft, a driven pulley connected to the countershaft, and a belt transmitting power from the driving pulley to the driven pulley, wherein the drive axle is operatively connected to the countershaft; and wherein the countershaft axis is disposed between the muffler and the output shaft axis in the longitudinal direction of the snowmobile.

27. The snowmobile of claim 26, further comprising a reduction gearing operatively connecting the countershaft to the drive axle; and
    wherein the reduction gearing and continuously variable transmission are disposed on opposite sides of the longitudinal centerline of the snowmobile.

28. The snowmobile of claim 26, wherein the muffler is disposed between the countershaft axis and the drive axle axis.

29. The snowmobile of claim 20, wherein the at least one exhaust port is disposed on a front of the engine; and
    the exhaust system further includes:
        a tuned pipe fluidly connected to the at least one exhaust port; and
        an exhaust conduit fluidly connecting the tuned pipe to the muffler.

30. The snowmobile of claim 29, wherein the tuned pipe has:
    an inlet;
    a first portion connected to the inlet, the first portion extending from the inlet forwardly and laterally in a first direction from the inlet;
    a second generally U-shaped portion connected to the first portion, the second portion extending forwardly from the first portion, then laterally in a second direction across a longitudinally extending line passing through the inlet, the second direction being opposite the first direction, and then rearwardly; and
    a third portion connected to the second portion, the third portion extending rearwardly and laterally in the first direction from the second portion to an outlet of the tuned pipe, the third portion extending across the longitudinally extending line passing through the inlet;
    wherein the exhaust conduit is connected to the outlet of the tuned pipe; and
    wherein the exhaust conduit extends rearwardly from the outlet of the tuned pipe to the muffler.

31. The snowmobile of claim 20, wherein the exhaust system further includes an exhaust pipe having an inlet fluidly communicating with the muffler and an outlet fluidly communicating with atmosphere; and
    wherein the outlet faces downwardly and is disposed between the output shaft axis and the drive axle axis in the longitudinal direction of the snowmobile.

32. The snowmobile of claim 20, wherein the exhaust system further includes an exhaust pipe having an inlet fluidly communicating with the muffler and an outlet fluidly communicating with atmosphere; and
    wherein the outlet of the exhaust pipe is disposed laterally between lateral sides of the engine.

\* \* \* \* \*